Figure 1:
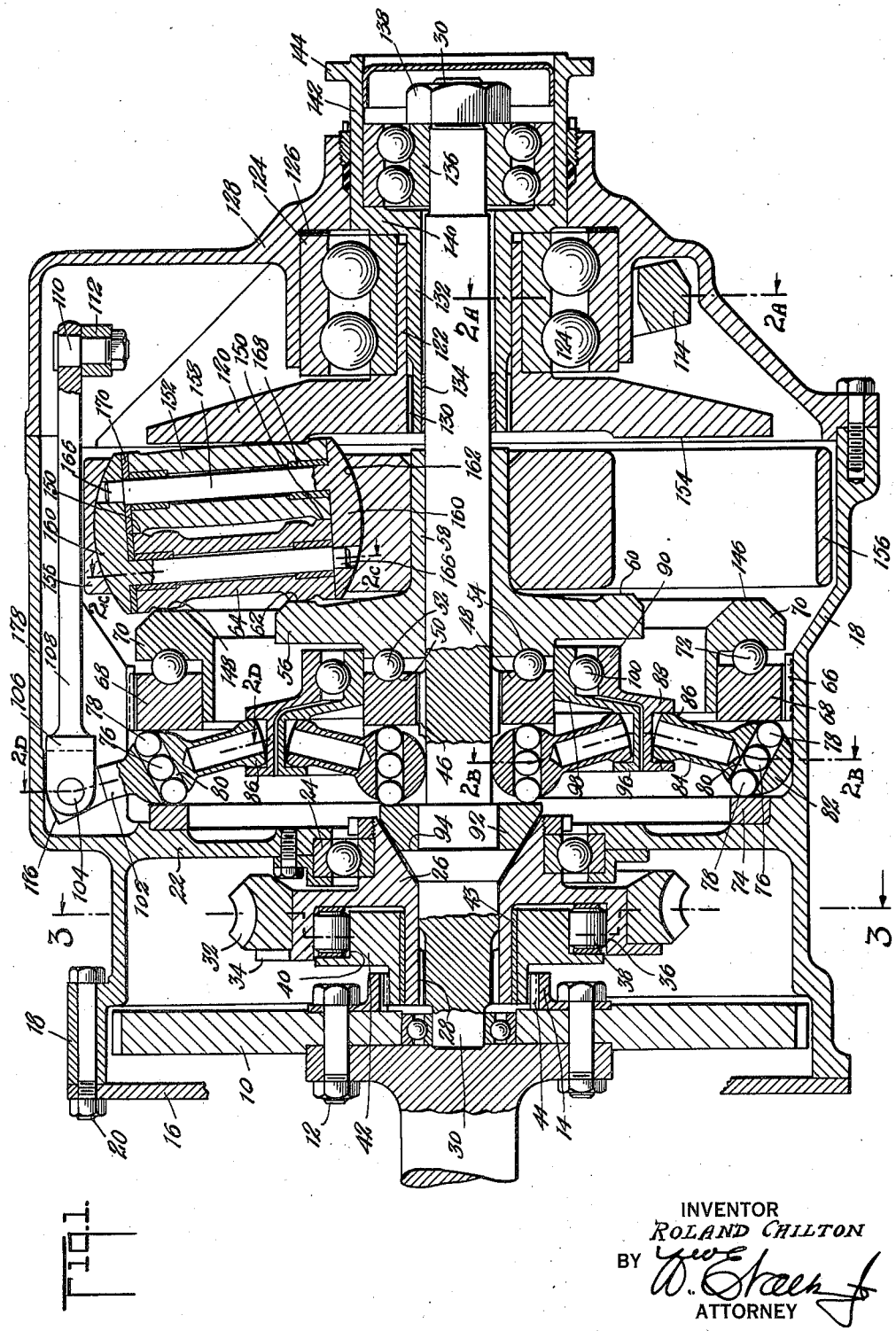

Nov. 24, 1936.   R. CHILTON   2,061,895
TRANSMISSION
Filed Sept. 11, 1934   3 Sheets-Sheet 1

INVENTOR
ROLAND CHILTON
BY
ATTORNEY

Nov. 24, 1936.  R. CHILTON  2,061,895
TRANSMISSION
Filed Sept. 11, 1934  3 Sheets—Sheet 2

INVENTOR
ROLAND CHILTON
BY
ATTORNEY

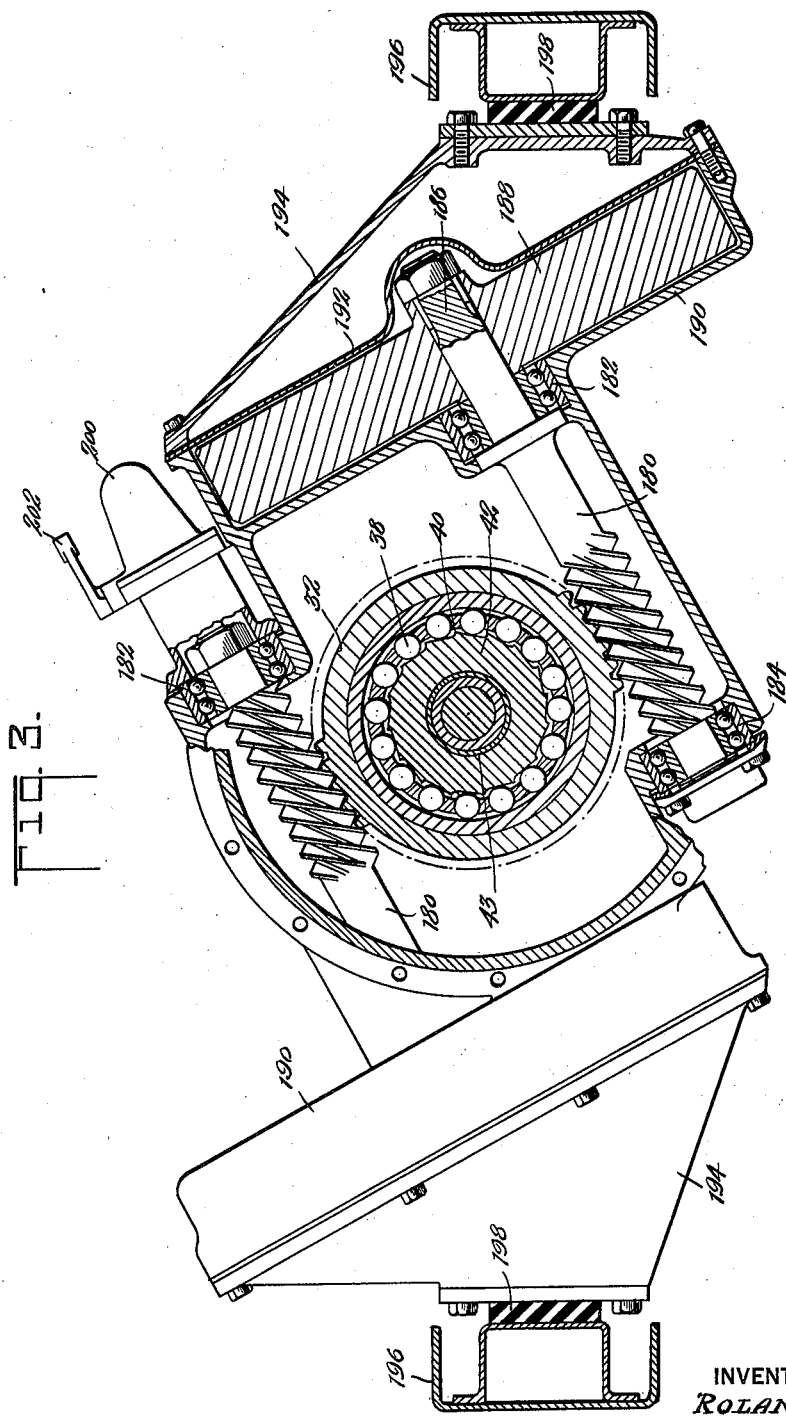

Patented Nov. 24, 1936

2,061,895

UNITED STATES PATENT OFFICE 2,061,895

TRANSMISSION

Roland Chilton, Ridgewood, N. J.

Application September 11, 1934, Serial No. 743,515

16 Claims. (Cl. 74—281)

My invention relates to variable speed transmissions of the type wherein smooth driving members are loaded into non-slipping rolling driving contact. In many aspects the invention may be said to constitute a continuing development of that type of transmission described and illustrated in my co-pending applications, Serial Numbers 669,144; 728,058; 742,751; and 742,752.

One object of the present invention is to provide a control mechanism which will develop very little frictional resistance to movement under the very high loads to which the mechanism is subject.

Another object is to provide a mechanism which will accurately correlate the movements of the various members in conformity to the particular requirements of the present environment.

Another object is to provide a mechanism of such simplified geometry as to be simple of production to very close limits of accuracy.

Another object is to provide a mechanism which will remain in stable equilibrium in all controlled positions regardless of the fact that the movements of the controlled members are unequally related, and that the loads on these members vary in relation and magnitude during operation.

Another object is to provide a control mechanism which will tend to preserve zero backlash at the torque-responsive contact loading devices despite the inequality in the bodily movements required by these members.

Another object is to provide a simplified anti-friction control member having toggle characteristics, i. e., one that may be angulated from dead center position.

Another object is to permit the interconnection of two relatively rotating members subject to high thrust without introducing a bearing subject to such high thrust.

A further object is to compensate for the inequality in the movement of respective ends of a member having rocking action against a contacted face.

A still further object is to provide a transmission particularly suited to withstand sudden reversals in the direction of driving load.

Other objects and advantages of the invention will be hereinafter pointed out.

Figure 2:
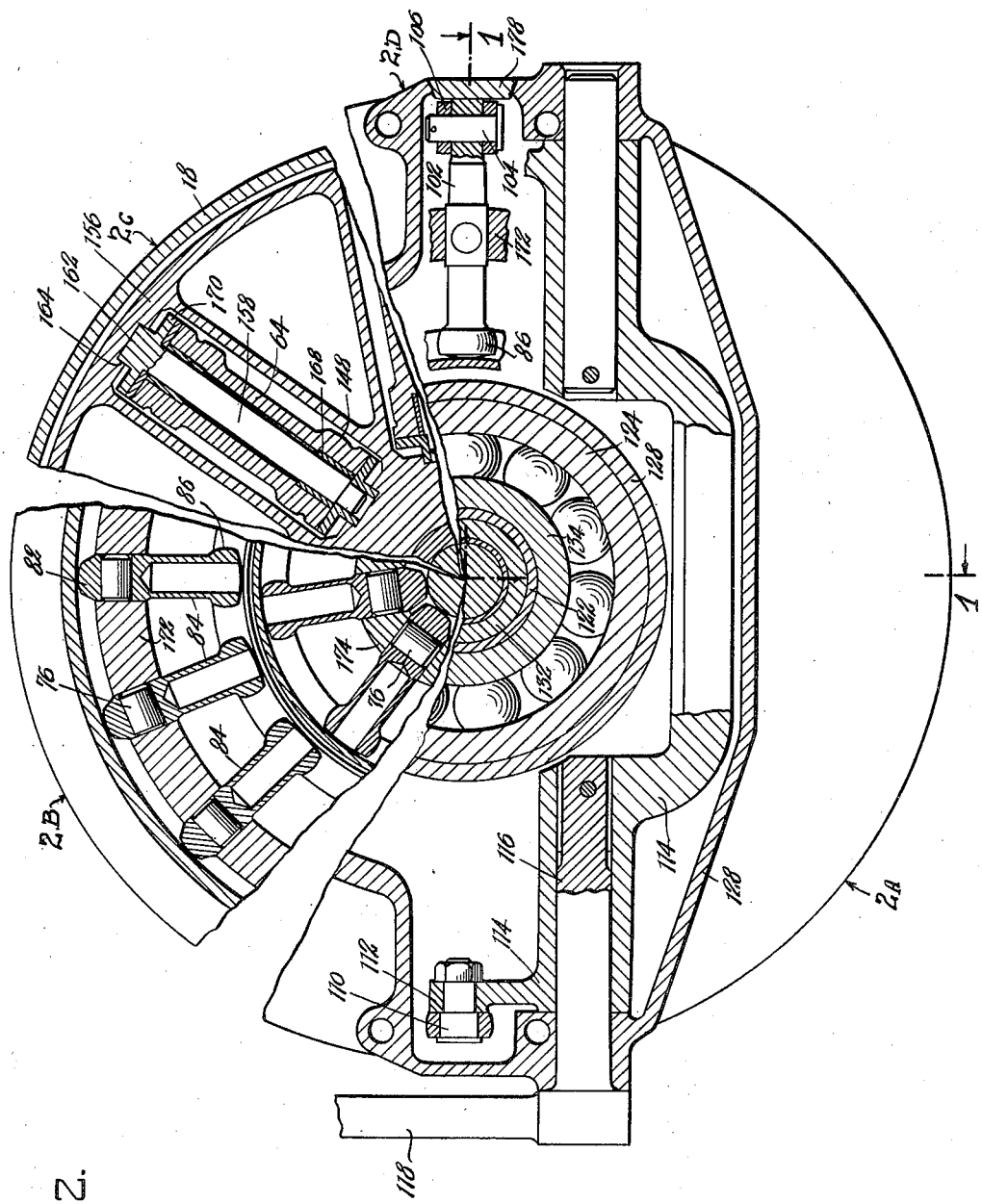

In the drawings:

Fig. 1 is a longitudinal section, the upper half in plan, and the lower half in elevation, on the line 1—1 of Fig. 2;

Fig. 2 comprises transverse sections as follows:

The lower part, segment 2a, is a fragmentary section on the line 2a of Fig. 1;

Segment 2b is a fragmentary section on the line 2b of Fig. 1;

Segment 2c is a fragmentary section through a planet roller on the line 2c of Fig. 1;

Segment d is a fragmentary section on the line 2d of Fig. 1; and

Figure 3 is an end elevation, the left hand part being in section, on the line 3—3 of Fig. 1.

Referring first to Fig. 1, 10 designates a conventional engine flywheel secured to the usual crankshaft flange by bolts 12 which also secure a splined driving member 14. The engine is provided with the usual end plate, indicated at 16, to which the main housing 18 of the transmission is secured by bolts 20. The housing 18 has a wall 22 supporting a bearing 24, which in turn rotatably supports a worm wheel hub 26 splined at 28 to a transmission main shaft 30.

The worm wheel hub 26 carries a worm wheel 32 drivably secured thereto by driving lugs 34 formed on the hub 26. The hub 26 has a smooth bore 36 with which are engaged one-way clutch rollers 38 which also engage cam surfaces 40 on a cam member 42 rotatable on a bushing 43 and drivably engaged at 44 for rotation with the splined flywheel drive member 14. It will be seen that the worm wheel 32 is secured rigidly for rotation with the main shaft 30, but that these parts may over-run the engine flywheel 10 by virtue of the one-way drive roller clutch 36, 38, 40.

Splined for slight axial movement as at 46 on the main shaft 30 is a driving torque-responsive member 48 having circumferentially inclined tracks 50 engaging balls 52 which in turn engage similar and opposed inclined tracks 54 formed in a driving member 56 which is free for slight rotation and axial travel, with a sleeve 58, upon the main shaft 30. The driving member 56 has a contact face 60 engaged with an enlarged portion 62 of rollers 64.

Splined at 66 into the main housing 18 is a reaction torque-responsive member 68, cooperating with a reaction member 70 through balls 72 engaging inclined tracks similar to those already described. Seated in the housing 18 is an abutment ring 74, and engaged between the abutment ring 74 and the reaction torque-responsive member 68, are a plurality of control elements each comprising a central roller 76, located in a cross hole (Figure 2b), and contacting a pair of end balls 78 freely engaged in an angularly disposed transverse bore 80 in the heads 82 of levers 84. Each lever has a spherical end 86 engaged with a groove formed in the periphery of an outer control ring 88 which carries an outer ball race 90.

Similar anti-friction toggle levers to those already described are engaged between the driving torque-responsive member 48 and a reaction ring 92 which abuts a shoulder 94 on the main shaft 30. These inner control levers extend outwardly to engage a groove formed in a control ring 96 integral with an inner race 98, which is thus connected for axial movement with the member 88 by means of balls 100 which, with the race members 90, 98, comprise a conventional annular type of thrust bearing.

Certain of the outer or reaction member control levers (in this case two diametrically opposed levers) have outward extensions 102 provided with pins 104 engaging clevices 106 of control links 108, the right hand ends of which links engage pins 110 secured in bosses 112 formed in a control yoke 114 (Fig. 2), into one end of which yoke is splined a control shaft 116 carrying, exteriorly of the casing, a control lever 118.

It will now be seen that the spherical ends 86 of the inner and outer levers are restrained to unitary axial motion by the members 96, 88 and by the associated ball bearing elements 90, 98, 100, so that, when the control yoke 114 is rocked by the lever 118, moving the drag links 108 in unison, and with them the lever extensions 102, all of the control levers are rocked; and that the inner control levers oscillate through equal angles but in the opposite rotational direction to the outer levers.

Opposed to the reaction member 70 and to the driving member 56 is a driven member 120 having a sleeve 122 on which is mounted a large thrust bearing 124 seated against an adjustment shim 126 in a rear housing cover section 128. Splined into the sleeve 122 at 130 is an inner sleeve 132 having a cylindrical extension 142 carrying a flange 144 to which a driven means may be attached in the usual way. Said sleeve 132 is rotatable on the main shaft 30, a bushing 134 and a ball thrust bearing 136 being provided for this purpose. The primary purpose of the thrust bearing 136, however, is to take the large contact pressure reactions from the driving member 56. The ball thrust bearing 136 is secured axially on the shaft 30 by a thrust nut 138 and abuts a wall 140 integral with the sleeve 132. The primary function of the ball thrust bearing 136 is to take the large contact pressure reactions from the driving member—its use with the bushing 134 for radial location being secondary.

The reaction member 70 has a contact face 146 engaged with the outer portion 148 of rollers 64. Engaged with either end of each roller at 150 is a companion roller 152 which has a rockered or arcuate profile engaging the flat face 154 of the driven member 120 as shown.

The rollers 64 and 152 are rockably mounted in pairs in a cage 156 (free for rotation on the sleeve 58) by means of similar spindles 158, each of which is integral with a head 160 having an arcuately profiled key portion 162 engaged in a corresponding groove 164 machined in the cage 156. The non-integral ends of the spindles 158 have a reduced diameter 166, engaged in a hole formed in the head of the companion spindle. The rollers are provided at either end with bushings 168, and at their outer ends with floating thrust washers 170.

It will thus be seen that the rollers 64 and 152 are rotatably supported on the spindles 158 in contacting pairs drivably engaged at 150, and that by means of the arcuate heads 160 each pair of rollers may tilt as a unit within the cage 156, so as to rock the arcuate contact face of the rollers 152 to shift their contact across the engaging face 154 of the driven member 120.

Each paired roller assembly may be considered as a beam loaded at its respective ends by the reaction member 70 and the driving member 56, said beam having a movable fulcrum comprising the rockered shiftable contact of the rollers 152 against the face 154 of the driven member. Thus, should the reaction member 70 be advanced towards the driven member 120, while the driving member 56 is retracted to the appropriate degree, the rollers will be tilted, moving the contact point of the rollers 152 outwardly across the driven member face 154. It is the function of the control levers 84 with their anti-friction toggle-action rolling means 76, 78 to co-relate these motions without disturbing the contact pressures generated by the torque-responsive means, and without engendering other than bodily axial motion thereat.

The transmission has been drawn in the high gear position, whereat the contact with the driven member face 154 is opposite the contact with the driving member face 60. In this condition all of the drive is transmitted through the driving member, there being zero torque reaction upon the reaction member 70. It will thus be seen that, appropriate to this condition, the anti-friction rollers of the inner toggle control members are in their "dead center" position, whereat there is zero reaction or turning moment on these inner control levers from the high contact loads to which they are subject. Similarly, as the control levers are moved to the other extreme of their travel, the outer control toggle levers will reach their "dead center" position moving the reaction member 70, and the associated torque-responsive ring 68, bodily to the right, rocking the contact of the barrel-shaped roller 152 so as to be opposite to the contact face 146 of the reaction member 70, in which position the entire driving reaction, and therefore the entire contact loads, are generated by the reaction member torque-responsive device exclusively, but, due to the dead center position of the outer control levers, these loads produce no reaction upon the control. In this condition there is zero torque and therefore zero contact loads are generated by the driving member torque-responsive means, whereby there is also zero reaction on the inner control member (in spite of inclined disposition of the balls).

It will be seen that, when the inner toggle levers have maximum angularity, they are carrying zero contact loads, and that the outer toggle levers then have zero angularity, and are then carrying all of the contact loads, and vice versa. At the mid-contact position of the rollers 152 on the driven member face 154 the toggle levers have equal angularity and obviously carry equal load.

From the foregoing, it will be seen that the entire control system is in stable equilibrium in all positions, and that no reactions from the contact pressure loads react upon the operator's control lever 118, since these reactions cancel out in equal and opposite reactions between the control rings 88, 96 through the thrust bearing 90, 98, 100. This result is particularly difficult to achieve because it happens that, when a rocker such as the roller 152 is rocked from midposition against a contacting face, the approaching end of the roller moves much less than does the receding end, and the relative movements do not have a straight line relationship. The factor causing unequal approach and recession of the ends of a member with respect to a surface against which it is rocked is a natural geometric property of any circular curve. This may be readily observed by scaling up, for instance, the end movements of a rocking chair rocker with respect to the floor. If the rocker be rocked from mid-position, i. e., that position where the ends of the rocker are equidistant from the floor or contacted surface, the receding end will move much farther than the approaching movement of the other end. The geometry involved may be somewhat obscure, and it may be difficult in the present invention to choose a convenient toggle length of separation between the balls 78, with the appropriate angle of swing of the toggle levers 84, to achieve entire accuracy in the case where simple flat faces are used on the cooperating abutment members 74 and 92. In that case these members may be given a slight slope or arcuity of face to modify the geometry of the entire system, as needed to avoid all relative movement in the torque-responsive devices, and thus to avoid the backlash under reversing torque which has been one of the difficulties operating against the successful use of certain transmissions in the prior art having torque-responsive contact pressure means. It may be said that any discrepancy from perfect reaction balance in a control system of the proportion shown, and utilizing simple flat contact faces for the toggle ball, is so small as to be beyond the range of easy detection by ordinary full-scale drafting methods. It will be obvious to those skilled in the art, however, that, by suitably simulating the toggle action in a grinding machine, by which the faces of the abutment members are finished, the appropriate form may be generated automatically, even though its precise dimensions may be difficult of geometrical definition.

The foregoing remarks have been predicated on the assumption that a true circular arc has been selected for the profile of the rocking rollers in cooperation with a truly flat face for the driven member. Alternatively, the profile of the rockered rollers may be generated by rocking these across a flat faced grinding wheel, in a grinding fixture wherein the roller is controlled by a pair of toggle levers exactly simulating those to be used in the transmission. In either case the objective of zero reactions on the operator's control lever is achieved when the combined geometry of the parts is such as to involve no axial movement of the driven member relative to the toggle abutment members (and the housing) throughout the rocking action, whereby the torque-responsive devices will be held to zero backlash; (except in the small degree occasioned by the elastic yield of the parts under the increasing contact loads generated by the torque-responsive devices under increasing torque load). On this account, great rigidity against deformation under contact loads is sought, and this comprises one of the advantages of the novel toggle control system herein disclosed.

Due to the extremely high loads under which these levers must be moved, efficient anti-friction means are necessary, and the levers with an angular bore freely containing an odd number of contacting rollers, comprising a tiltable roller bearing strut, afford a novel and simple means for achieving this object. It will also be noted that it is important to have all of the toggle levers of exact geometrical equality. In the levers here disclosed it is only necessary to control the angularity of the cross holes, which may all be ground in the same gig; the length to the center of the spherical ends, and the uniformity of the balls or rollers, which are commercially procurable to a high degree of accuracy. It will be noted that the bodily radial and circumferential location of the levers does not affect the accuracy of the result. The angularly bored heads 82 of the levers are formed spherically about the bore for central rollers 76, and these contact the shaft 30, or a concentric bore machined in the housing beyond the spline 66, as shown. Similarly, the termination of the ball ends 86 are again formed spherical about the center of the roller 76, and by engagement with the cylindrical bases of the grooves in the members 88, 96 complete the radial location of the levers. The angularly bored spherical heads are flated off as seen in Fig. 2b to engage suitable slots formed between projections 172, 174 on the reaction member torque-responsive ring 68 and the driving member torque-responsive ring 48, whereby the levers are radially located. In the case of the levers having the extension 102 for the control links 108 an arcuate end 176 is provided to engage a suitable surface machined in the pocket 178 of the housing 18.

The ratio changing function of the transmission is similar to that already described in said co-pending applications. A model has been submitted in order to substantiate the mode of operation there described in alternate terms, and a slightly different method of explanation here follows: Assuming that the contacting ends 150 of the rollers are of equal diameter, and that the diameters of the portions 62 and 148 engaging the driving member 56 and the reaction member 70, and the diameters at corresponding points towards the end of the barreled rollers 152, are also equal, and that the cage be held from rotation, then,—considering only the driving member 56 and the driven member face 154 (the reaction member being removed to permit fixation of the cage) it will be seen that, with contact at equal radius on the driving and driven member as shown, these must rotate at equal speeds, and in the same direction. Actually, this still holds true even though the cage be rotated, and regardless of the speed or direction of rotation of the cage. By straight line analogy—whenever a pair of contacting rollers are non-slippably engaged for translation between opposed members those members are held to unitary movement regardless of the rate of translation.

A similar condition obtains when the contact point on the driven member is moved, by rocking the rollers, to exact opposition (i. e. to equal radius) to the contact of the reaction member 70. The driven member is now held to unitary rotation with the (fixed) reaction member, i. e., the transmission is in zero ratio, whereat there is no movement of the driven member regardless of the speed of the driving member, or cage.

In between these extremes of one-to-one and one-to-zero ratios, the ratio is determined by the rocked position of the rollers on the driven member, and it is a special feature of this type of transmission that the contact load on the driven member is the sum of the contact loads on the driving and reaction member. It is a principle of transmission in general that the driving effort on the driven member is the sum of the driving efforts on the driving and reaction members in any forward ratio; therefore, it follows that the torque-responsive contact pressures generated at the driving and reaction members react in a resultant pressure on the driven member which is also always proportional to the driving effort regardless of changes in the radius of contact on this member. This result is not obtained where a single torque-responsive contact pressure means is used on a member having variable radius of contact, in which case a slope-ratio in the torque-responsive tracks, which is adequate to prevent slipping at the lesser radius, will generate excessive contact loads for the larger radius condition, leading to unnecessary friction loss thereat.

As has been seen, the ratio of the torques devolving upon the driving and reaction members are proportional to the rocked position of the roller contact between the driving and reaction member opposing points on the driven member, and it will be obvious that the proportion of the reaction member contact loads at respective ends of the rollers must bear the same relation, whence, the entire system is in stable equilibrium in all rocked positions, and regardless of variation in magnitude or direction of the driving loads or driven member torque. However, with the proportions shown the control mechanism cannot rock the rollers beyond the points where the driven member contacts reach the radii of the driving and reaction members respectively, although such over-travel would represent over-speed and reverse driving ratios, respectively. Accordingly, when it is desired to provide for a slow speed reverse drive, the element 148 of the rollers 64 may be increased in diameter. Considering the effect of this by assuming the rollers rocked to their outer contacts, opposite to that of the reaction member, and again considering the cage as held from rotation, it will be clear that the driven member would now rotate at slightly less speed than the reaction member, giving a reverse drive under the actual condition where the reaction member is held and the cage rotates with the rollers planetizing.

As mentioned in said co-pending applications, the speed of rotation of the cage depends upon the diameter ratio between the driving and reaction members. While contact with these is maintained, the cage will always rotate in the opposite direction to the driving member, and will do so at equal speed in the case where this diameter ratio is one-to-two, approximately as shown. However, in the high gear position shown, the contact pressures are exclusively across from the driving member contact, relieving the reaction member of contact pressure, as is appropriate to the zero torque condition necessarily obtaining at this member in the one-to-one (forward) ratio position. Thus, the reaction member contact has nothing to prevent slippage, and in fact, due to the slight frictional resistance to planetization of the rollers, the cage will choose to rotate forwardly at unitary speed with the other parts, giving direct drive in high without rolling contact, until the control is moved away from the direct drive position and some contact load again devolves upon the reaction member, re-establishing rolling contact thereat, which will bring the cage to its normal backward rotation, which maintains in all except the one-to-one ratio position.

In connection with the foregoing, it may be necessary to remark that applicant is well aware that, in the case where a planetary roller such as 64 having two equal contact diameters is engaged with a pair of members also having equal contact diameters (which would change the radial disposition of the rollers to axial parallelism with the other members) then the two members are restrained to equal speed of rotation, and such a construction would be inoperative for the purposes of this invention. Such axially parallel planetary rollers would be analogous to spur gears, whereas the rollers of the present invention, being axially normal to the engaged members, (or substantially so) are analogous to bevel gears, the ratio of which is determined by the pitch cone angles subtended by the respective contacts, and cannot be determined from the fact that the roller contacts have equal radius, when the engaged members have different radii, whereby the respective contacts subtend different pitch cone angles. In one of said co-pending applications the fixed radius contacts do actually comprise bevel gears, and this conception of pitch cone angles as defining the ratio between members having intersecting axes may be important in order to avoid misunderstanding. If the rollers were of conical formation so that their contacts with respective members subtended equal angles, then the members would be limited to unitary rotation.

It is to be understood that the improved variable ratio transmission organization so far described comprises only a part of the present invention, which is not however, limited to use in combination with the improved kinetic regenerative transmission embodiment now to be described, although many of the novel features are of particular advantage in such a specific environment.

Referring now to Fig. 3, the teeth of the worm wheel 32 will be seen as meshed with a pair of similar worms 180, supported on suitable bearings 182, 184, and having shafts extending at 186 to carry massive flywheels 188 enclosed in housings 190 having internal cover plates 192 and structural covers 194 comprising arms through which the transmission is carried by frame members 196, as by the usual rubber mount 198.

A casing 200 houses a suitable governor driven by the associated flywheel shaft and having the external control lever 202, connected to the carburetor throttle of an engine (not shown) whereby the throttle is maintained open until the flywheel has reached a pre-determined maximum speed, and then closed until the flywheel has been de-energized to a pre-determined minimum speed.

The particular lateral location for the flywheels shown is of advantage in that they occupy no more space vertically than that which must in any event be available for the normal engine flywheel and transmission, while utilizing the space normally available in a vehicle between the frame members on either side of the usual transmission. It will be noted that, in this vicinity, it is the vertical dimension defining the ground clearance and floor board interference which represent the space limitations in ordinary automobile installations.

The kinetic operation of this flywheel system whereby energy is interchanged between the driven means and the flywheels, by changing ratio, whereby one is accelerated by energy obtained by decelerating the other, giving a single lever control throughout the entire speed range of the vehicle, and regenerative "braking" without the normal power loss in friction brakes, has all been described at length in my co-pending application, Serial Number 732,182. It should be mentioned that this system imposes continual reversals of driving torque on the transmission as the vehicle is controlled from acceleration to deceleration, and hence the importance of the novel control means by which backlash from the ratio changing movement is avoided. Further, since the entire speed control of the vehicle is vested in a single lever (or pedal) which comprises the sole driver's speed control, extreme ease of operation, such as ensured by the anti-friction toggle levers of this invention, is an important feature.

However, since the rate of energy interchange possible between the flywheel and the vehicle has no connection with the capacity of the engine, and since the acceleration and deceleration of the vehicle will follow, without lag, the rate of movement of the control lever, it would be possible (with a completely frictionless control system) for a lungeous operator to impose accelerations which would over-tax the tractive capacity of the driving wheels; the physical strength of the transmission mechanism, or the comfort of the passengers. The slight residual friction in the control mechanism, however, will tend against this eventuality, as the resistance to movement of the control lever will increase with increasing driving load, that is to say, with increasing rates of acceleration or deceleration whereby extraordinary effort on the control will be needed to produce extraordinary acceleration, which may make it unnecessary to provide extraneous means to prevent unduly jerky manipulation.

In the organization shown, the control lever has been arranged so as to require forward motion for acceleration and vice versa, and a simple means to prevent abusive operation would be to load the end of this lever with a substantial mass, the inertia of which would always oppose, to the driver's effort, a force proportional to the resulting rate of acceleration.

On the other hand, should it be found in certain cases that excessive control effort is necessary to obtain a desired maximum rate of acceleration, then any of the known servo or booster means may be used, and suitable devices have been described in my co-pending applications.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In a transmission, in combination, a rocker member, means comprising toggle levers effective toward opposite ends of said rocker member to rock said member, and means for connecting said toggles for simultaneous movement, said connecting means and said toggles being so organized that in one position of adjustment said toggles are caused to assume positions of maximum and zero angularity respectively.

2. In a transmission, in combination, a rocker member, means comprising toggle levers effective toward opposite ends of said rocker member to rock said member, and means for connecting said toggles for simultaneous movement, said connecting means and toggles being so organized that in the mid position of adjustment of said toggles the toggles are caused to assume equal angles.

3. In a transmission, in combination, a rocker member, means comprising toggle levers effective toward opposite ends of said rocker member to rock said member, and means for connecting said toggles for simultaneous movement, said connecting means and toggles being so organized that in one position of adjustment said toggles are caused to assume a dead center position and a position of maximum angularity respectively.

4. In a transmission, in combination, a rocker member, means comprising toggle levers effective toward opposite ends of said rocker member to rock said member, and means for connecting said toggles for simultaneous movement, said connecting means and toggles being so organized that in the mid position of adjustment of said toggles the toggles are caused to assume equal though opposite angles.

5. In a transmission having a shiftable contact including a member adapted to be rocked, contact loading means and load transmitting means adapted to rock said member and at the same time maintain said load while said member is being rocked, and means comprising toggle levers effective toward opposite ends of said rocker member to rock said member, said toggles being so organized and connected that in one position of adjustment they are caused to assume positions of maximum and minimum angularity respectively.

6. In a transmission, in combination, a rocker member, a member bearing on one side of said rocker member toward its outer end, a member bearing on the same side of said rocker member toward its inner end, said members being relatively axially movable to rock said rocker member in effecting a ratio change, and means including inner and outer lever assemblies individually effective on the corresponding members and operable to simultaneously move said members in conformity with the movement due to said rocking.

7. In a transmission, in combination, a cage member mounted for planetization about an axis, a member mounted in said cage for rocking movement lengthwise said axis, and a pair of contacting rollers carried by said rocker member and with one or the other of which rollers a drive member, a driven member and a re-action member are adapted to engage.

8. In a transmission, in combination, a cage member mounted for planetization about an axis, a rocker member mounted in said cage, and a pair of contacting rollers carried by said rocker member and with one or the other of which rollers a drive member, a driven member and a reaction member are adapted to engage.

9. In a transmission, in combination, rollers rockably mounted in pairs in a cage member on spindles, each spindle being integral with a head portion having an arcuately profiled key engaged in a correspondingly profiled groove formed in said cage member, a drive member with which one of said rollers is adapted to engage, and a driven member with which the other of said rollers is adapted to engage.

10. The combination with a member to be rocked under load by unequally moving its opposite ends, of means adapted to effect said rocking and compensate for said inequality comprising inclinable struts associated respectively with the ends of said member, and means interconnecting said struts for maximum angularity of one strut when the other is at minimum angularity.

11. The combination with a member to be rocked under load by unequally moving its opposite ends, of means adapted to effect said rocking and compensate for said inequality comprising inclinable struts associated respectively with the ends of said member, said struts comprising contacting rollers and means interconnecting said struts for maximum angularity of one strut when the other is at minimum angularity.

12. In a transmission, in combination, a disc and a roller rockably contacted, two contact loading means subject to opposite relative movement during said rocking, and means including interconnected levers associated with respective contact loading means and each comprising a roller-ended strut adapted to transmit the contact load to said roller.

13. In a transmission, in combination, a planet cage having arcuate grooves, and a pair of spindles each having at one end a head engaged within one said groove, the other end of each spindle being engaged in a hole in the companion head.

14. The combination with a planetary roller carrier having arcuate grooves, of a pair of roller spindles having arcuate heads engaging within said grooves, the anti-head end of each said spindle engaging in a hole in the head of the other said spindle.

15. The combination with a transmission planet carrier having arcuate guides, of a pair of heads engaging said guides, and a pair of spindles, one extending from each head and engaging the head of the other said spindle.

16. In a transmission having members to be rocked, said rocking involving unequal approach and recess of opposite ends of the members, rigid abutment means, and means cooperating therewith comprising tiltable roller assemblies effective at said ends to rock said members and at the same time compensate for said inequality despite said rigidity.

ROLAND CHILTON.